(12) United States Patent
Westphal (10) Patent No.: US 9,613,283 B2
(45) Date of Patent: Apr. 4, 2017

(54) SYSTEM AND METHOD FOR USING AN IMAGE TO PROVIDE SEARCH RESULTS

(71) Applicant: W.W. Grainger, Inc., Lake Forest, IL (US)

(72) Inventor: Geoffry A. Westphal, Evanston, IL (US)

(73) Assignee: W.W. Grainger, Inc., Lake Forest, IL (US)

(*) Notice: Subject to any disclaimer, the term of this patent is extended or adjusted under 35 U.S.C. 154(b) by 0 days.

(21) Appl. No.: 14/637,556

(22) Filed: Mar. 4, 2015

(65) Prior Publication Data
US 2015/0178314 A1    Jun. 25, 2015

Related U.S. Application Data (62) Division of application No. 13/295,710, filed on Nov. 14, 2011, now Pat. No. 9,001,147.

(51) Int. Cl.
| | |
|---|---|
| *G06K 9/20* | (2006.01) |
| *G06F 17/30* | (2006.01) |
| *G06K 9/32* | (2006.01) |
| *G06Q 30/06* | (2012.01) |
| *G06T 3/40* | (2006.01) |
| *G06T 3/00* | (2006.01) |

(52) U.S. Cl.
CPC ..... *G06K 9/2081* (2013.01); *G06F 17/30247* (2013.01); *G06K 9/3233* (2013.01); *G06Q 30/0625* (2013.01); *G06T 3/4023* (2013.01); *G06T 3/0093* (2013.01); *G06T 2200/24* (2013.01); *G06T 2207/20112* (2013.01); *G06T 2207/20224* (2013.01); *G06T 2210/32* (2013.01); *G06T 2210/36* (2013.01)

(58) Field of Classification Search
CPC ............ G06K 9/2081; G06F 17/30247; G06T 2200/24
See application file for complete search history.

(56) References Cited

U.S. PATENT DOCUMENTS

| | | | |
|---|---|---|---|
| 5,267,332 A | 11/1993 | Walch et al. | |
| 7,657,126 B2* | 2/2010 | Gokturk | ............ G06F 17/30259 358/403 |
| 7,765,231 B2 | 7/2010 | Rathus et al. | |
| 2005/0197763 A1 | 9/2005 | Robbins et al. | |
| 2008/0317353 A1* | 12/2008 | Chien | ............... G06F 17/30247 382/195 |
| 2009/0060289 A1 | 3/2009 | Shah et al. | |
| 2010/0076960 A1* | 3/2010 | Sarkissian | ......... G06F 17/30867 707/722 |
| 2010/0250588 A1* | 9/2010 | Kita | ................... G06F 17/30265 707/769 |
| 2010/0303342 A1 | 12/2010 | Berg et al. | |
| 2011/0206275 A1* | 8/2011 | Takahashi | ............. G06T 7/0044 382/159 |

(Continued)

*Primary Examiner* — Michelle L Sams
(74) *Attorney, Agent, or Firm* — Greenberg Traurig, LLP (57) ABSTRACT

A system and method uses an image manipulating application to define in an object image a plurality of discrete cells. Predefined image information is substituted for image information in selected ones of the plurality of discrete cells to form a translated version of the object image. The translated version of the object image may then be provided to an image recognition capable search engine to obtain search results.

2 Claims, 10 Drawing Sheets

(56) References Cited

U.S. PATENT DOCUMENTS

| | | | |
|---|---|---|---|
| 2011/0222744 A1* | 9/2011 | Kim | G06K 9/00281 |
| | | | 382/118 |
| 2011/0273479 A1 | 11/2011 | Ingrassia, Jr. et al. | |
| 2012/0121187 A1 | 5/2012 | Lee et al. | |
| 2013/0006953 A1* | 1/2013 | Epshtein | G06Q 30/02 |
| | | | 707/706 |
| 2013/0060766 A1* | 3/2013 | Lin | G06F 17/30259 |
| | | | 707/723 |

* cited by examiner

SYSTEM AND METHOD FOR USING AN IMAGE TO PROVIDE SEARCH RESULTS

RELATED APPLICATION INFORMATION

This application claims the benefit of and is a divisional of U.S. application Ser. No. 13/295,710, filed on Nov. 14, 2011, the disclosure of which is incorporated herein by reference in its entirety.

BACKGROUND

Image recognition system are generally known. By way of example, U.S. Pat. No. 5,267,332 describes a method and apparatus in which images are characterized and compared on the basis of internal structure, which is independent of image size and image orientation. A library of reference images is first generated and stored, then each input image, or test image, is compared to the images stored in the library until a match is found. The image is represented in memory as nodes, lines, and curves. A plurality of descriptors, called reference keys and reference series, are generated for both the reference images and the test image. The reference library is screened for likely matches by comparing the descriptors for the test image to the descriptors in the reference images in the library. Inclusionary and exclusionary tests are performed. After screening, each candidate reference image is searched by comparing the pathway through the reference image and the pathway through the test image, and by the degree of correlation between the reference and test images. In addition, the link ratio, a measure of the portion of the test image actually matched to the reference image is computed.

SUMMARY OF THE INVENTION

The following generally describes a system and method for using an image to provide search results. More particularly, a system and method is described that uses an image manipulating application to define in an object image a plurality of discrete cells. Predefined image information is then substituted for image information in selected ones of the plurality of discrete cells to form a translated version of the object image. The translated version of the object image may then be provided to an image recognition capable search engine (which may include plural search engines on a network and/or within the cloud) to obtain search results.

Still further, the system and method may provide for receiving input to cause the image manipulating application to zoom selected ones of the plurality of discrete cells whereupon the image manipulating application defines in the zoomed ones of the plurality of discrete cells a plurality of discrete sub-cells. The image manipulating application may then be instructed to substitute predefined image information for image information contained within selected ones of the plurality of discrete sub-cells to thereby form a translated version of the object image.

Additionally, the system and method may iteratively cause the image manipulating application to substitute predefined image information for image information contained within selected ones of the plurality of discrete cells to thereby form a plurality of translated versions of the object image whereupon each of the plurality of translated versions of the object image is provided to an image recognition capable search engine to thereby obtain search results. The search results obtained in this manner are then grouped according to one or more predefined criteria.

Still further, each of the plurality of translated versions of the object image may be provided to an image recognition capable search engine to thereby obtain search results until such time as the search results obtained by the image recognition capable search engine in response to a one of the plurality of translated versions of the object image changes. The search results obtained in response to the one of the plurality of translated versions of the object image resulting in the change may then be displayed.

Yet further, when an object image is received at an image recognition capable search engine, the image recognition search engine may be used to locate a plurality of views of one or more objects that match information contained within the object image. The plurality of views are then displayed and input indicative of the selection of one or more of the displayed plurality of views is then usable to select information indicative of the objects represented by the selected one or more of the displayed plurality of views.

Additionally, obtained search results may be displayed to a user whereby a prior purchasing behavior of the user is utilized to emphasize within the search results a select one more objects that are the subject of the obtained search results.

Still further, the obtained search results may be automatically displayed to a user in a comparison matrix that lists one or more parametric values associated with an object that is the subject of the obtained search results.

Yet further, a selection guide may be automatically displayed to a user whereby the user may input information related to one or more parametric values associated with an object that is the subject of the obtained search results.

While the forgoing provides a general explanation of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which.

DETAILED DESCRIPTION

Figure 1:
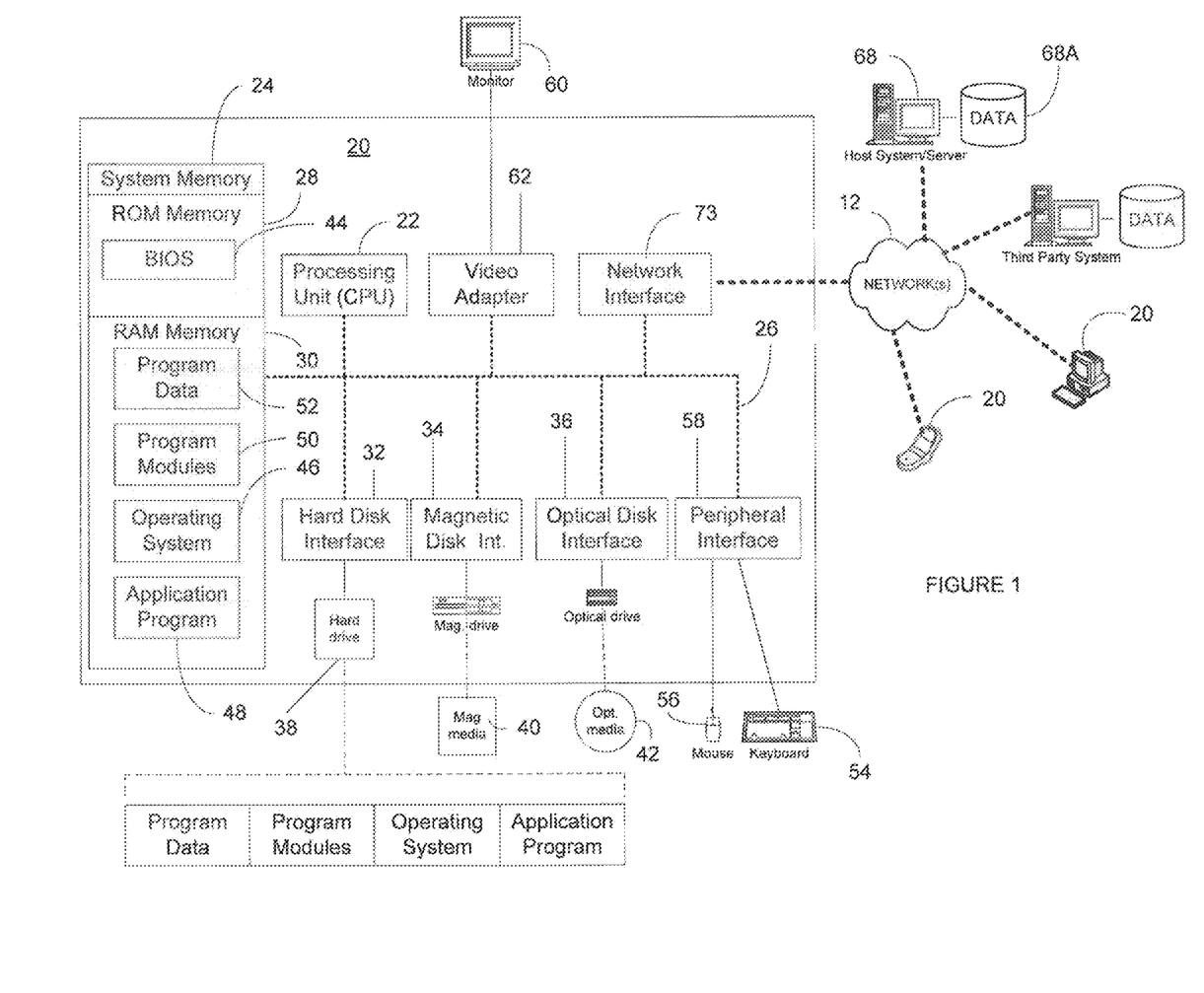
FIG. 1 is a block diagram illustrating components of an exemplary network system in which the subject method may be employed.

With reference to the figures, a system and method is hereinafter described for providing an image to an image recognition capable system to thereby obtain search results. While not intended to be limiting, the system and method will be described in the context of a plurality of processing devices linked via a network, such as a local area network or a wide area network, as illustrated in FIG. 1. In this regard, a processing device 20, illustrated in the exemplary form of a device having conventional computer components, is provided with executable instructions to, for example, provide a means for a user to access a remote processing device, i.e., a server system 68, via the network to, among other things, perform a search via use of an image recognition capable search engine supported by the remote processing device. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant ("PDA"), cellular or smart telephone, tablet computer, or the like. Furthermore, while described and illustrated in the context of a single processing device 20, those skilled in the art will also appreciate that the various tasks described hereinafter may be practiced in a distributed or cloud-like environment having multiple processing devices linked via a local or wide-area network whereby the executable instructions may be associated with and/or executed by one or more of multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated non-transient, computer-readable media allow for the non-volatile storage of computer readable instructions, data structures, program modules and other data for the processing device 20. Those skilled in the art will further appreciate that other types of non-transient, computer readable media that can store data may be used for this same purpose. Examples of such media devices include, but are not limited to, magnetic cassettes, flash memory cards, digital videodisks, Bernoulli cartridges, random access memories, nanodrives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser, camera, picture editor, etc.), other program modules 50, and/or program data 52. Still further, computer-executable instructions may be downloaded to one or more of the computing devices as needed, for example, via a network connection.

A user may interact with the various application programs, etc. of the processing device, e.g., to enter commands and information into the processing device 20, through input devices such as a touch screen or keyboard 54 and/or a pointing device 56. While not illustrated, other input devices may include a microphone, a joystick, a game pad, a scanner, a camera, a gesture recognizing device, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

The processing device 20 may also utilize logical connections to one or more remote processing devices, such as the server system 68 having one or more associated data repositories 68A, e.g., storing a repository of reference images, a database of product information, etc. In this regard, while the server system 68 has been illustrated in the exemplary form of a computer, it will be appreciated that the server system 68 may, like processing device 20, be any type of device having processing capabilities. Again, it will be appreciated that the server system 68 need not be implemented as a single device but may be implemented in a manner such that the tasks performed by the server system 68 are distributed to a plurality of processing devices linked through a communication network, e.g., implemented in the cloud. Additionally, the server system 68 may have logical connections to other third party server systems via the network 12 as needed and, via such connections, will be associated with data repositories that are associated with such other third party server systems.

For performing tasks, the server system 68 may include many or all of the elements described above relative to the processing device 20. By way of further example, the server system 68 includes executable instructions stored on a non-transient memory device for, among other things, handling search requests, performing image recognition processing, providing search results, etc. Communications between the processing device 20 and the server system 68 may be exchanged via a further processing device, such as a network router that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the server system 68.

To provide search results to a user, the server system 68 will have access to an image recognition capable search engine which will attempt to locate likely matches for an object image, e.g., an image uploaded to the server system 68. To this end, the image recognition capable search engine utilizes one or more known image recognition techniques, such as wavelet transformation techniques, intensity-based or feature-based techniques, orientation-invariant feature descriptor techniques, scale-invariant feature transformation techniques, etc. to determine if one or more reference images in a library of reference images, e.g., maintained in data repository 68A, matches or is similar to the object image. Because examples of devices adapted to perform image recognition through use of one or more of techniques may be found in US Published Application No. 2009/0161968, U.S. Pat. No. 7,639,881, and U.S. Pat. No. 5,267,332, among other references, the details of how such devices operate need not be explained in greater detail herein.

Figure 2:
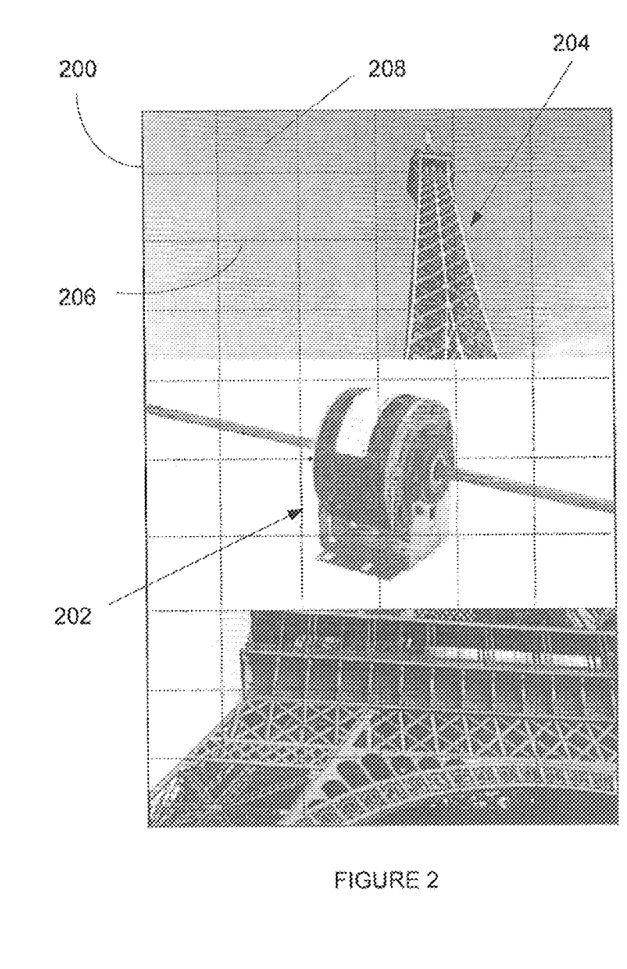
FIG. 2 illustrates an exemplary object image having exemplary shaped cells provided for creating a translated version of the object image.

To improve upon the likelihood that the image recognition capable search engine will be able to find a match for a subject object (e.g., a product being sold by a vendor) within an object image, particularly in the case where the subject object is embedded within the object image, a means for generating a translation of the object image is provided. By way of example, an "embedded" subject object could be an air conditioner motor in an object image that shows the subject object positioned on a work bench amongst other items. Similarly, an "embedded" subject object could be a valve in an object image that shows all of the internals (e.g., fans, wires, pipes, etc.) of an air conditioning unit in which the valve is currently located. Thus, an "embedded" subject object may be considered to be an object that is shown in an image in connection with other "background" objects that might themselves be recognizable by the image recognition capable search engine. An example of such an object image 200 is shown in FIG. 2. In this regard, FIG. 2 illustrates a subject object 202, e.g., a motor, embedded in the object image 200 with one or more further objects 204, e.g., the "Eiffel Tower," which further objects would themselves be recognizable by the image recognition capable search engine (See, e.g., search results shown in FIG. 3 resulting from the submission of the image of FIG. 2 to a conventional image recognition capable search engine).

To form a translated object image from an object image to, among other things, emphasize within the object image a subject object, an image manipulating application, which may reside on the computing device 20, on the server device 68, in the cloud, etc, is provided to remove from the object image extraneous information, particularly image information that is associated with "background" objects. In keeping with the example object image 200 illustrated in FIG. 2, the image manipulating application would thus be used to emphasize the subject object, e.g., motor 204, by removing from the object image 200 some or all of the extraneous, "background" related image information, e.g., some or all of the image information associated with the "Eiffel Tower" 204 and background shown in FIG. 2. The image manipulating application may be resident on a device having image capturing capabilities to thereby allow the object image to be captured and translated via use of a single device, e.g., a smart phone.

For allowing a user to easily remove such extraneous, "background" related image information, the image manipulating application first functions to superimpose a logical grid 206 upon the object image 200 as further shown in FIG. 2. The logical grid 206 serves to define within the object image 200 a plurality of discrete image cells 208. While the discrete image cells 208 in the illustrated example are provided with a generally square shape, it will be appreciated that the discrete image cells 208 can be provided with any shape as desired. Thus, the logical grid 206 that is used to visually define the discrete image cells 208 need not be composed solely of horizontally and vertically oriented, continuous lines as illustrated in FIG. 2 but could instead have any number of lines having any number of orientations as needed to create discrete image cells 208 of one or more desired shapes.

Figure 4:
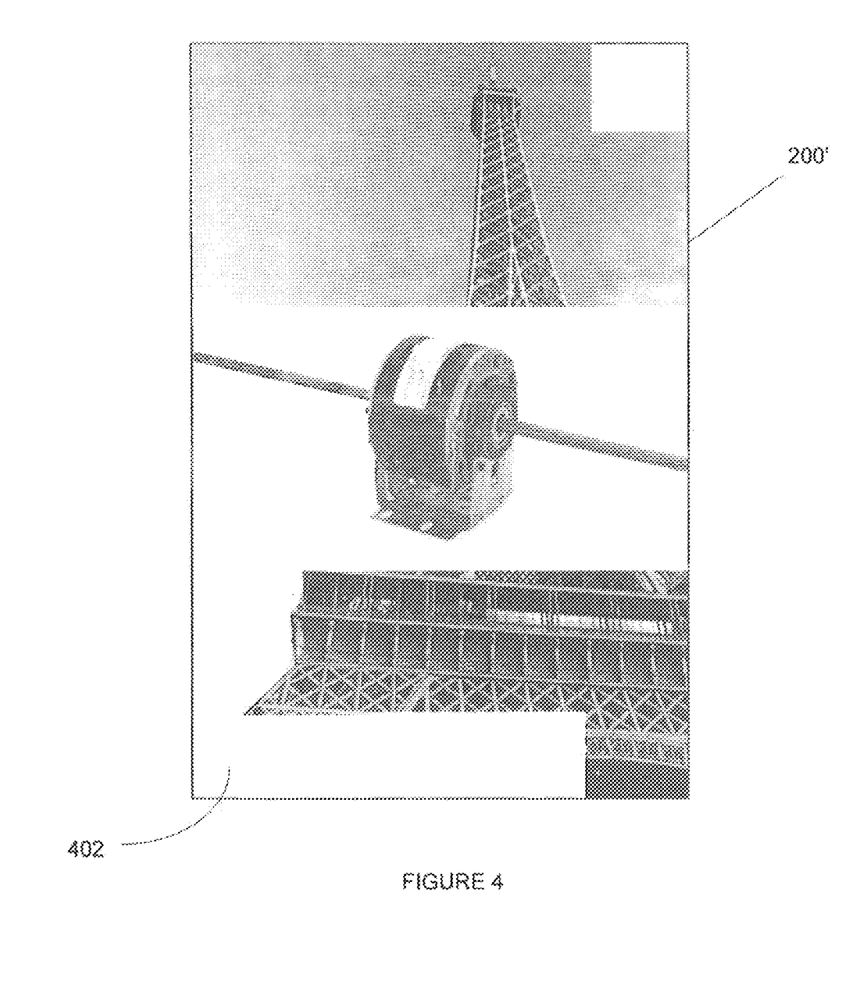
FIG. 4 illustrates an exemplary translated version of the object image of FIG. 2.

Once the object image 200 has been provided with the plurality of discrete image cells 208, the user may interact with the object image 200, e.g., via use of device 20, to thereby cause the image information within one or more of the plurality of discrete image cells 208 to be removed from the object image 200. The removal of the image information from within one or more of the plurality of discrete image cells 208 can be effected by generally substituting pre-defined image information for the image information originally presented within selected ones of the plurality of discrete image cells 208, e.g., image information that is of a uniform color such as white, black, transparent, etc. By way of example, FIG. 4 illustrates object image 200 wherein the original image information within selected ones of the discrete image cells 208 has been replaced with white image information 402 to thereby create translated image 200'. As will be appreciated from the discussion that follows, this image information substitution process can be repeated as many times as needed to create one or more translated versions 200' of the object image 200.

To allow a user to designate which ones of the discrete image cells 208 are to be removed from the object image 200 for the purpose of emphasizing within any resulting translated image 200' the subject object 202, the entirety of the object image 200 could be displayed to the user and the user may then merely select the various ones of the discrete image cells 208 which are to be removed. The selection of the discrete image cells 208 could be made via a user making a gesture upon a touch screen sector overlaying a discrete image cell 208 that is to be removed, e.g., a swiping gesture. The selection of the discrete image cells 208 could also be made by moving a cursor into a discrete image cell 208 that is to be removed and thereafter interacting with a designated "erasing" key, e.g., on a mouse, keypad, or the like. Accordingly, any number of means for selecting a discrete image cell 208 to remove the corresponding image information from an image 200 can be utilized.

In certain circumstances, one or more of the discrete image cells 208 could also be selected for zooming. As before, the selection of the discrete image cells 208 could be made via a user making a further recognized gesture upon a touch screen sector overlaying a discrete image cell 208 that is to be zoomed, e.g., a double tapping gesture, by moving a cursor into a discrete image cell 208 that and thereafter interacting with a designated "zooming" key, e.g., on a mouse, keypad, or the like, etc. In response, the system may then cause the "zoomed" discrete image cell 208 to be displayed with an overlay that functions to define within the "zoomed" discrete image cell 208 a plurality of discrete sub-image cells having any desired shape and size. The user may then select one or more of the discrete sub-image cells for removal in the manner described previously. Upon completion of this process, the image information in the translated discrete image cell will be used in lieu of the original image information presented within that same discrete image cell to thereby provide a translated version of the object image 200'.

In still further circumstances, the system may present to the user, in any desired order, each of the discrete image cells 208 (or subgroups thereof) whereupon the user may indicate to the system that the currently displayed image cell 208 (or various one thereof) is to be removed, zoomed, or left as is. As before, the user may indicate the desired action by performing a recognized gesture upon a touch screen within which the discrete image cell 208 is being displayed, via activation of a corresponding key on a keyboard or mouse, etc. without limitation. Furthermore, the user may indicate to the system that no further discrete image cells 208 are to be presented and that the translated object image 200' is to be provided to the image recognition capable search engine in its current form.

Figure 5:
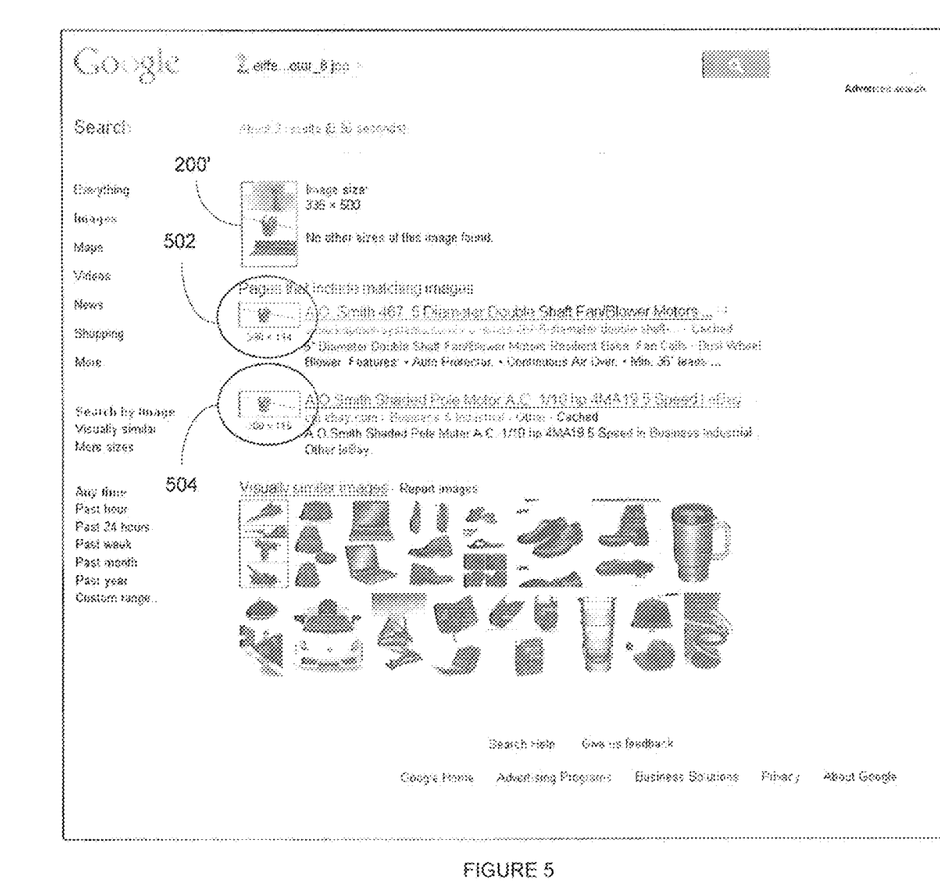
FIG. 5 illustrates an exemplary search results page obtained by providing a first translated object image to the image recognition capable search engine.

FIG. 5 illustrates an example of search results achieved by providing the image recognition capable search engine with a translated object image 200' created via the method steps described above. As is apparent, the removal of at least a part of the extraneous "background" image information from the object image 200 via the method steps described above has allowed the image recognition capable search engine to discern a match for the subject object 202, the results of which are shown as listings 502 and 504. The translated object image 200' can be automatically submitted to the image recognition capable search engine when a user indicates that the image information removal process has been completed or the translated object image 200' can be stored for provision to the image recognition capable search engine at a later time.

Figure 3:
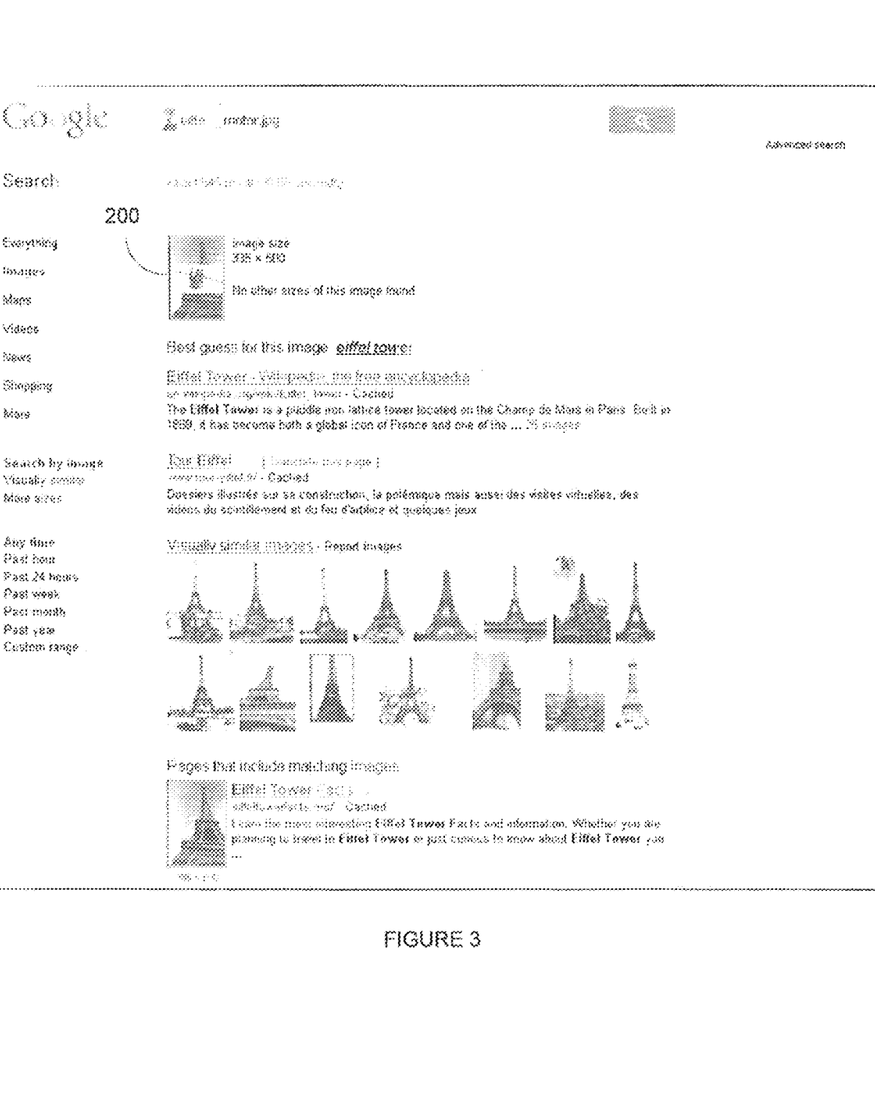
FIG. 3 illustrates an exemplary search results page obtained by providing the object image of FIG. 2 to an image recognition capable search engine.
Figure 6:
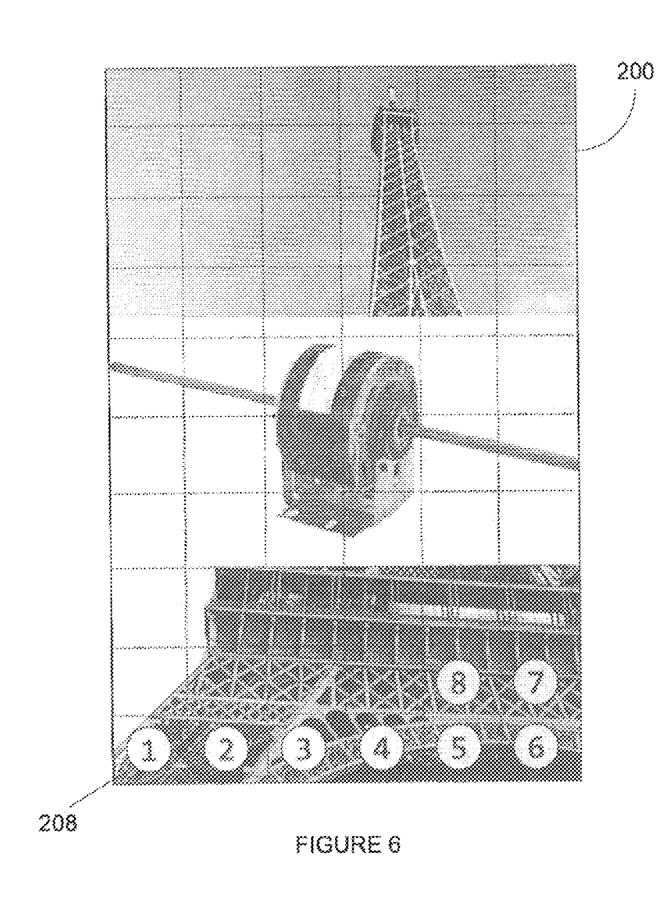
FIG. 6 illustrates an exemplary ordering for automatically removing image information from the object image of FIG. 2 for creating a translated version of the object image.
Figure 7:
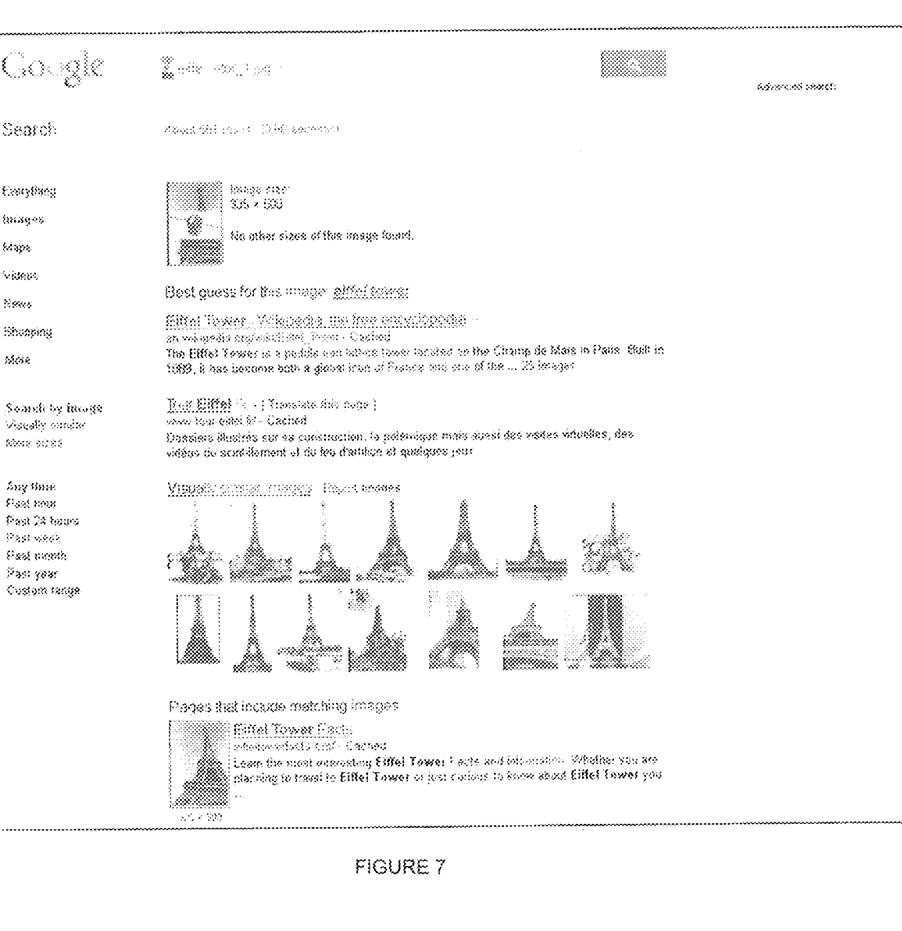
FIG. 7 illustrates an exemplary search results page obtained by providing a second translated object image to the image recognition capable search engine.

While the foregoing describes a system wherein a user manually interacts with an object image 200 to create a translated object image 200' that is to be submitted to the image recognition capable search engine, it will be appreciated that some or all of the image removal steps could be performed automatically by the system. By way of example, the system could remove image information from select ones of the discrete image cells 208 in a step-wise fashion to form a corresponding plurality of translated object images 200' each of which are provided to the image recognition capable search engine (preferably with the submissions also be performed automatically) in an attempt to obtain search results. As shown in FIG. 6, the image information in discrete image cell labeled 1 could be removed with the resulting translated object image 200' being submitted to the image recognition capable search engine, the image information in discrete image cells labeled 1 and 2 could removed with the resulting translated object image 200' being submitted to the image recognition capable search engine, the image information in discrete image cells labeled 1-3 could removed with the resulting translated object image 200' being submitted to the image recognition capable search engine, etc. with this step-wise removal process being continued until such time as the image recognition capable search engine returns a different search result, i.e., the image recognition capable search engine signifies that a different object within the object image is being recognized. (See, e.g., the search results in FIG. 3 showing image 200 being recognized as the "Eiffel Tower," the search results in FIG. 7 wherein a translated version of image 200 with the cell labeled 1 having been removed is still being recognized as the "Eiffel Tower," and the search results in FIG. 5 wherein a further translated version of image 200 with cells labeled 1-6 and others having been removed now being recognized as a motor). It is to be understood that the discrete cells 208 need not be automatically removed in the linear manner illustrated in this example and that other patterns could be employed for this same purpose.

In still further circumstances, the automated process described above need not be stopped upon the first occurrence of a different search result being obtained. Rather, the process may continue with each of the resulting translated images 200' being submitted to the image recognition system. As will be appreciated, numerous different combinations and permutations of the original image 200 may be obtained by selectively removing ones of the discrete cells 208 which may then result in plural different search results being provided by the image recognition capable search engine. Such obtained, plural different search results could then be presented to the user in an organized manner with the search results being grouped or sub-grouped according to one or more of common or similar image matches, URLs, meta tags or labels, descriptive words, etc. In this regard, it will be understood that, within the data repository 68A, the images maintained in the library of reference images may be associated with one or more meta tags and/or one or more sources of information, e.g. URLs leading to a product detail pages of an electronic catalog of a vendor of products, key words, descriptors, etc. which information would be considered to facilitate such organizational groupings. It will also be appreciated that the search result grouping could also be ordered when presented to the customer, for example based upon the number of search results within a group, past user viewing histories, etc. Yet further, a search result groupings could be placed into a folder to, for example, ease in dissemination/sharing of the search results to/with others.

While the foregoing describes examples wherein multiple different translated images created via use of an image substitution technique are submitted to an image recognition capable search engine for processing, it will be appreciated that other image manipulation techniques may be utilized to create from the original image multiple different translated versions thereof. For example, the object image can be automatically or manually subjected to various different image processing techniques, such as edge detection techniques, color balancing techniques, contrast balancing techniques, input and out curve adjusting techniques, rotation techniques, flipping techniques, normalization techniques, etc., which may be applied to the object image in various different combinations to thereby create multiple different translated versions of the object image that could be selected for provision to the image recognition capable search engine as described above.

Figure 8:
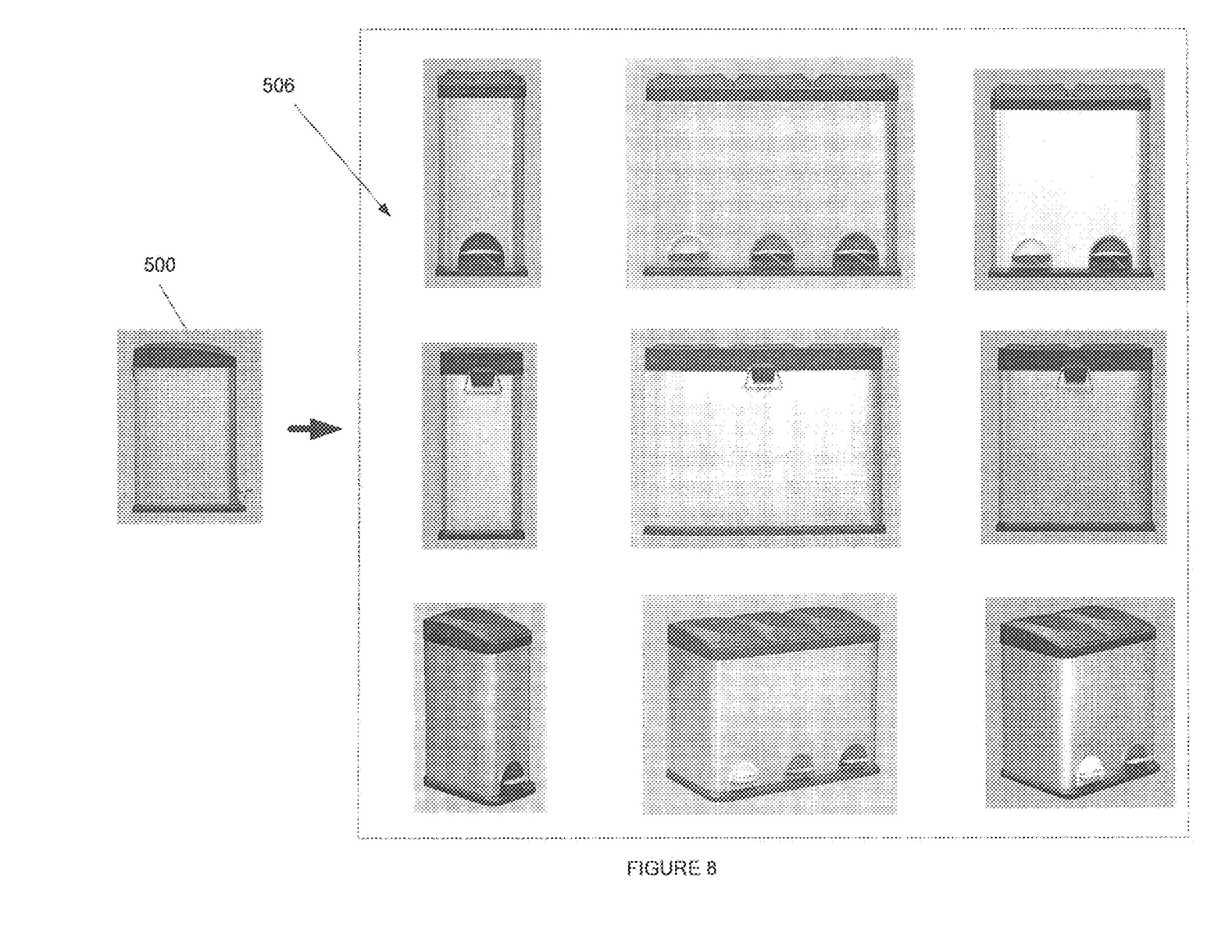
FIG. 8 illustrates an exemplary search results page displaying views of objects discerned by an image recognition capable search engine as being a match for an object shown in an object image.

In still further circumstances, the results obtained by the image recognition capable search engine may include further images that have been linked to any matching reference images within the data repository 68A. Such further images may be additional views of the subject object which presented additional views of the subject object could be interacted with by the user to further refine their search. For example, if object image 500 of FIG. 8 is submitted to the image recognition capable search engine there may not be enough distinguishing characteristics within the image 500 to allow the image recognition capable search engine to discern a matching reference object. In this circumstance, the image recognition capable search engine may respond by providing the user with other views of the various reference objects that have an association with an image view that matches to the object image 500. In the example illustrated in FIG. 8, each of the trash cans has a similar side elevational view. Because each of the trash cans would be a possible matching product for the product shown in object image 500, the system provides to the user further views 506 of the possible product matches, in this example a rear elevational view, a front elevational view, and a perspective view. Other views can be provided as necessary. The user may then select from the further presented views 506 the one or more images that shows the product characteristics the user is looking for and, in response to such selections, further image searching may be performed as needed. The user would then be presented with the one or more products that has the various features included within the views that have been selected by the user. To assist in such searching, the further views 506 that are presented to the user may also be tagged with keywords that could be provided to a search engine to return such search results. The further views may also be directly linked to sources of information that could be returned to the user upon a selection of the presented views 506, e.g., links to a product detail page within an electronic catalog.

To provide more meaningful search results, the search results that are presented to the user in response to an image being submitted to the image recognition capable search engine may be automatically filtered and/or provided with a predefined ordering. For example, for a known customer, e.g., a customer providing a system recognized user-id or other indicia, the search results returned by the image recognition capable search engine can be filtered and/or ordered considering information known about the user, such as a prior purchasing history that is associated with a system recognized customer identifier. To this end, the data repository 68A would maintain such filtering information, e.g., the prior purchasing histories, in a manner that allows such filtering information be cross-referenced to one or more of such customer associated identifiers.

By way of more specific example, considering a case where a system recognized user submits to an image recognition capable search engine an image which includes a WEG 3-phase NEMA premium efficient motor—which submitted image need not be translated using any of the techniques discussed above—and wherein the image recognition capable search engine discerns a plurality of potential matches for the object within the image (e.g., motors sold by a vendor that have a similar appearance but different characteristics). In such a case, the plurality of potential matches could be filtered considering the prior purchasing history of the customer such that the plurality of potential matches is filtered to present to the user only those objects (e.g., motors) that the user has previously purchased from the vendor. Similarly, the plurality of potential match could be ordered to place at the start of a listing of the search results those objects (e.g., motors) that the user has previously purchased from the vendor. Alternatively, the objects (e.g., motors) that the user has previously purchased from the vendor could be highlighted or otherwise provided with some emphasizing indicia to thereby call out to the customer those objects (e.g., motors) within the search results that the user has previously purchased.

In a still further example, the indicia representative of the customer could be a ship to and/or an ordering address represented by a GPS coordinate, zip code, network location, or the like type of location data. Thus, in keeping with the example of a user submitting an image of a motor to the image recognition capable search engine, the plurality of potential matches, i.e., search results, could then be filtered considering such location information whereby the plurality of potential matches is filtered to present to the user only those objects (e.g., motors) that the system determines where previously shipped to and/or ordered from that location. Similarly, the plurality of potential match could be ordered to place at the start of a listing of the search results those objects (e.g., motors) that the system determines where previously shipped to and/or ordered from that location. Alternatively, the objects (e.g., motors) could be highlighted or otherwise provided with some emphasizing indicia to thereby call out to the customer those objects (e.g., motors) within the search results that were previously shipped to and/or ordered at that location.

Figure 9:
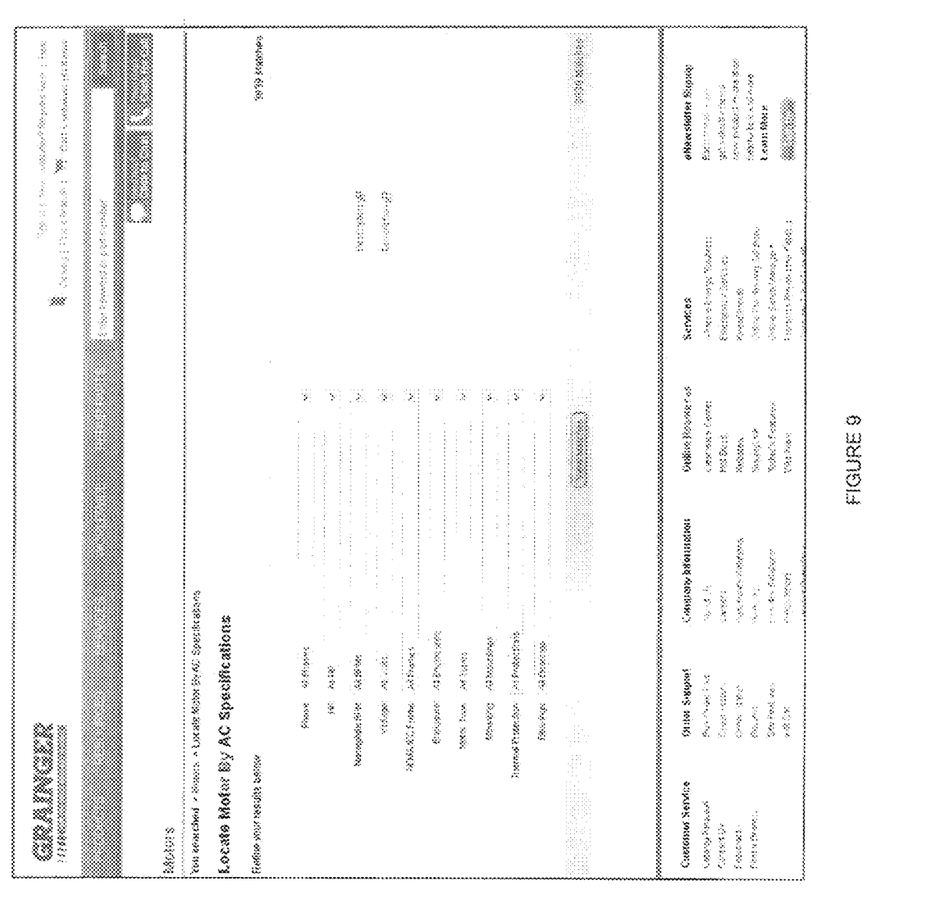
FIG. 9 illustrates an exemplary selection guide which is automatically presented to a user as a search result.
Figure 10:
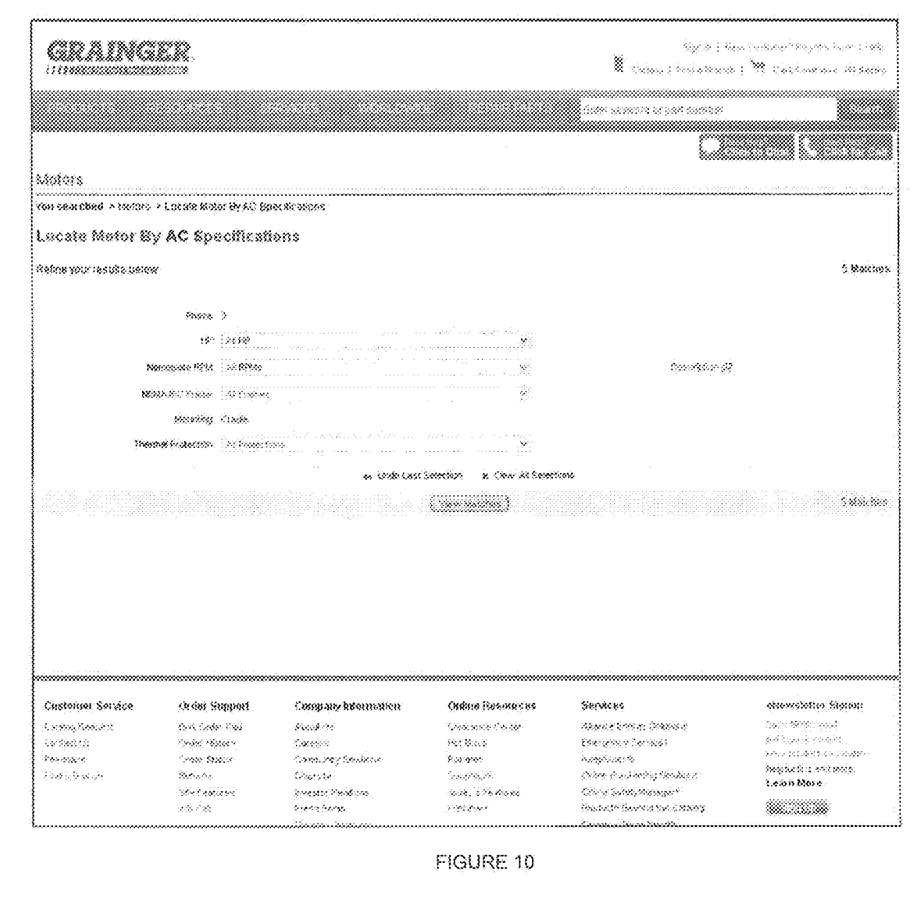
FIG. 10 illustrates the exemplary selection guide of FIG. 9 automatically pre-populated with information considering information associated with the search results.

To allow a user to quickly locate a product of interest within returned search results, the system may additionally function to automatically invoke a parametric search guide as appropriate. For example, if the information associated with the search results (e.g., motors) that are discerned by the image recognition search engine to be a match for the one or more images submitted to the image recognition capable search engine is information that the system discerns is generally parametric in nature, e.g., the objects associated with the search results generally differ by size, color, operating characteristics, etc., the system may cause an appropriate selection guide, such as illustrated in FIG. 9, to be presented to the user. While illustrated in the exemplary form of a motor selection guide, which allows a user to locate a motor of interest using parametric values associated with motor phase, motor horsepower, etc, it is to be appreciated that the selection guide could be associated with any type of object, e.g., lamps, casters, etc., that would be definable considering parameters or other labels. In still further circumstances, where the search results provided by the image recognition capable search engine have one or more common parametric values associated therewith (e.g., the search results relate to motors that share the parameters 3-phase and cradle mounted), such information can be automatically pre-populated within the selection guide when the selection guide is presented to the user by the system, as illustrated in FIG. 10. When the selection guide is pre-populated with information in this manner, the system may also automatically function to remove those parameters (e.g., voltage, motor type, bearing type as seen in a comparison of FIGS. 9 and 10) that are not applicable to or would not otherwise be useful to further refine the objects (e.g., motors) to be located via use of the selection guide (e.g., motors having the known characteristics of 3-phase and cradle mounted). As is conventional, upon the user executing the selection guide search function, e.g., by clicking on the "view matches" icon, any parameters automatically or manually provided within the parametric fields of the selection guide will be submitted to an otherwise conventional search engine in an attempt to locate those motors, e.g., within an electronic catalog of a vendor, that meet the search criteria. It will be appreciated that a predetermined set of rules may be applied by the system to determine when a selection guide is to be automatically presented to the user. The set of rules may include a threshold number of search results being obtained, a threshold number of parametric differences for the objects within the search results obtained, and/or the like without limitation.

Figure 11:
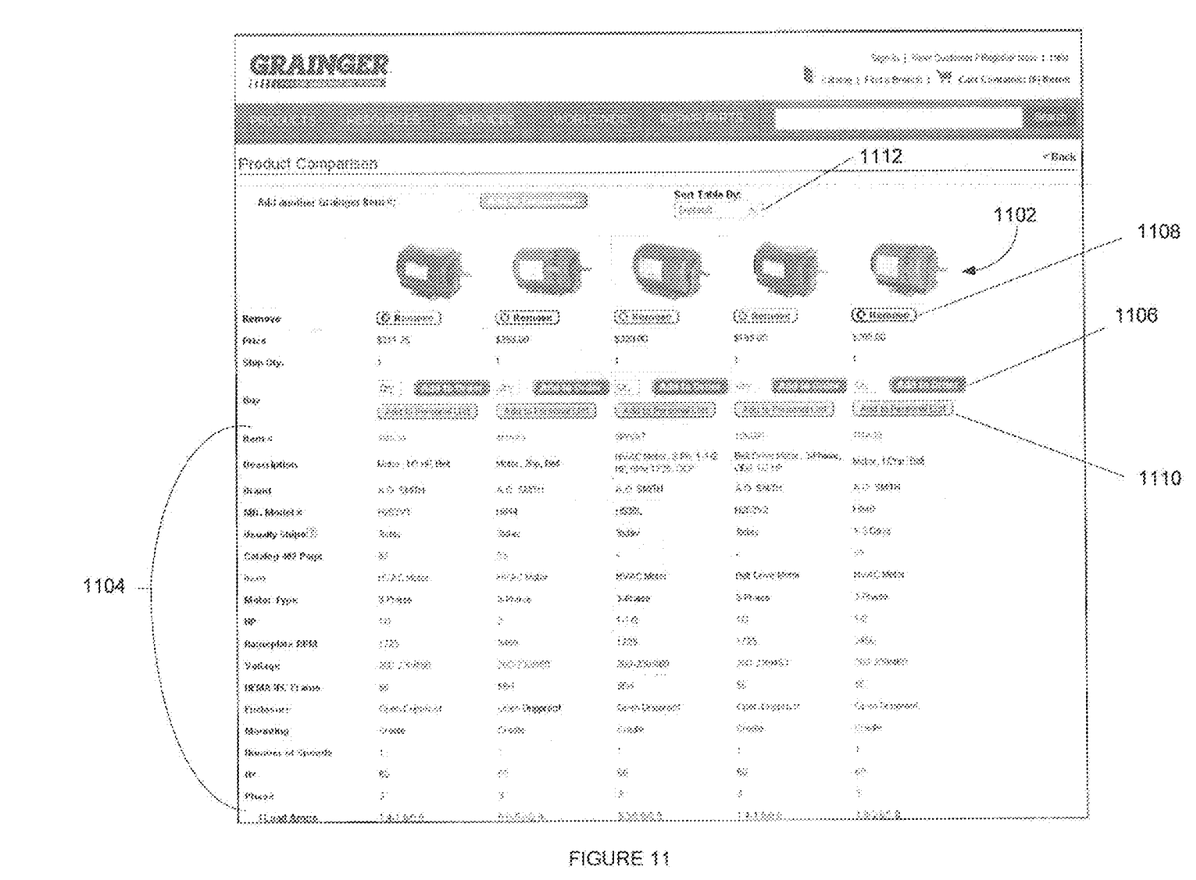
FIG. 11 illustrates an exemplary selection guide matrix display which is automatically presented to a user a search result.

While the above describes using a selection guide to allow a user to quickly locate a product of interest within returned search results, the system may alternatively function to automatically present search results in a product comparison matrix as illustrated in FIG. 11. For example, upon the user submitting to the image recognition capable search engine an object image showing a motor, in keeping with the examples above, the system may respond by presenting to the user a product comparison matrix which provides the user with an overview of some or all of the objects (e.g., motors 1102) that were determined by the system to meet the search criteria (e.g., the motor image) which overview further lists the parameters 1104, e.g., operating characteristics, that are associated with such objects. The presented product comparison page may additionally provide user interface elements for allowing a user to purchase 1106 a presented object, e.g., by adding it to a shopping cart, to remove 1108 a presented object from the displayed page, to add 1110 the object to a listing of objects, and/or to sort 1112 the presented objects according to a predefined, selectable criteria. As before, a predetermined set of rules may be applied by the system to determine when a comparison matrix page is to be automatically presented to the user. The set of rules may include a threshold number of search results being obtained, a threshold number of parametric differences for the objects within the search results obtained, and/or the like without limitation.

While various concepts have been described in detail, it will be appreciated by those skilled in the art that various modifications and alternatives to those concepts could be developed in light of the overall teachings of the disclosure. For example, while described in the context of a networked system, it will be appreciated that the search engine functionality can be included on the search query receiving computer itself. Further, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A computer-readable media embodied in a non-transient, physical memory device having stored thereon computer executable instructions for providing search results via use of an image repository wherein the image repository includes, for each of a plurality of different products, to plurality of images and wherein each of the plurality of images for each of the plurality of different products shows a product view taken from a different angle with respect to the product, the instructions performing steps comprising:

receiving from a search requesting computing device a search request including an image of an object of interest;

using an image recognition search engine to identify within the data repository a first one of the plurality of different products wherein the image recognition search engine identifies the first one or the plurality of different products by determining that a one of the plurality of images for the first one of the plurality of different products as included within the image repository matches the image of the object of interest;

retrieving from the image repository at least one of the plurality of images for the first one of the plurality of different products, wherein the retrieved at least one of the plurality of images for the first one of the plurality of different products is different than the one of the plurality of images for the first one of the plurality of different products determined by the image recognition search engine to match the image of the object of interest;

using the image recognition search engine to identify within the data repository a second one of the plurality of different products wherein the image recognition search engine identifies the second One of the plurality of different products by determining that a one of the plurality of images for the second one of the plurality of different products as included within the image repository matches the image of the object of interest;

retrieving from the image repository at least one of the plurality of images for the second one the plural its of different products, wherein the retrieved at least one of the plurality of images for the second one of the plurality of different products is different than the one of the plurality of images for the first one of the plurality of different products determined by the image recognition search engine to match the image of the object of interest;

causing at least the retrieved at least one of the plurality of images for the first one of the plurality of different products and the at least one of the plurality of images for the second one of the plurality of different products to be returned to the search requesting computing device as search results in response to the search request;

receiving from the search requesting computing device selection input, wherein the selection input is indicative of a selection of at least one image included within the displayed, retrieved at least one of the plurality of images for the first one of the plurality of different products and the at least one of the plurality of images for the second one of the plurality of different products; and causing information for the first one of the plurality of different products and/or the second one of the plurality of different products to be presented on the requesting computing device as a function of the received selection input.

2. The computer-readable media as recited in claim 1, wherein the information for the first one of the plurality of different products and/or the second one of the plurality of different products comprises at least a link to one or more pages in an electronic product catalog.

* * * * *